(12) United States Patent
Tsuzuki et al.

(10) Patent No.: US 6,777,837 B2
(45) Date of Patent: Aug. 17, 2004

(54) HYBRID-VEHICLE DRIVE UNIT

(75) Inventors: Shigeo Tsuzuki, Anjo (JP); Kenji Omote, Anjo (JP); Masahiro Hasebe, Anjo (JP); Satoru Wakuta, Anjo (JP); Keiichi Shinohara, Anjo (JP); Atsushi Tabata, Toyota (JP); Yutaka Taga, Toyota (JP); Seiji Nakamura, Toyota (JP); Masaya Amano, Toyota (JP)

(73) Assignees: Aisin AW Co., Ltd. (JP); Toyota Jidosha Kabushiki Kaisha (JP)

( * ) Notice: Subject to any disclaimer, the term of this patent is extended or adjusted under 35 U.S.C. 154(b) by 0 days.

(21) Appl. No.: 09/949,837

(22) Filed: Sep. 12, 2001

(65) Prior Publication Data

US 2002/0036434 A1 Mar. 28, 2002

(30) Foreign Application Priority Data

Sep. 26, 2000 (JP) ....................... 2000-292979

(51) Int. Cl.$^7$ .............................. B60K 6/02; F16H 45/02
(52) U.S. Cl. ...................... 310/67 R; 180/65.2; 475/5; 310/75 R; 310/92; 310/112
(58) Field of Search ....................... 475/5; 310/67 R, 310/112, 89, 75 R, 92; 610/85 R; 180/65.2

(56) References Cited

U.S. PATENT DOCUMENTS

| 4,346,773 | A | * | 8/1982 | Hofbauer et al. ............ 180/165 |
|---|---|---|---|---|
| 4,958,095 | A | * | 9/1990 | Uchida et al. ................. 310/59 |
| 5,482,512 | A | * | 1/1996 | Stevenson ...................... 475/5 |
| 5,755,302 | A | * | 5/1998 | Lutz et al. ................. 180/65.2 |
| 5,773,904 | A | * | 6/1998 | Schiebold et al. ............ 310/92 |
| 5,789,823 | A | | 8/1998 | Sherman ....................... 290/47 |
| 6,092,985 | A | | 7/2000 | Winkam .................. 415/124.1 |
| 6,184,603 | B1 | * | 2/2001 | Hamai et al. ............. 310/75 R |
| 6,204,577 | B1 | * | 3/2001 | Chottiner et al. ............. 310/42 |
| 6,208,036 | B1 | * | 3/2001 | Evans et al. .................. 290/46 |
| 6,258,001 | B1 | * | 7/2001 | Wakuta et al. ................. 475/5 |
| 6,340,339 | B1 | * | 1/2002 | Tabata et al. .................. 475/5 |
| 6,354,974 | B1 | * | 3/2002 | Kozarekar ..................... 475/5 |
| 6,474,428 | B1 | * | 11/2002 | Fujikawa et al. .......... 180/65.2 |
| 6,478,101 | B1 | * | 11/2002 | Taniguchi et al. ......... 180/65.2 |

FOREIGN PATENT DOCUMENTS

| JP | 5-24447 | 2/1993 |
|---|---|---|
| JP | 5-30605 | 2/1993 |
| JP | 9-215270 | 8/1997 |

\* cited by examiner

*Primary Examiner*—Burton Mullins
(74) *Attorney, Agent, or Firm*—Lorusso, Loud & Kelly

(57) ABSTRACT

A hybrid-vehicle drive unit supports a motor-generator with high precision, improving the efficiency of the motor-generator, and reducing the size of the motor-generator, independent of any influence of centering precision of the crank shaft and of deformation of the torque converter. According to the invention, a motor housing is disposed between a converter housing and an internal combustion engine, and a bearing is fitted to a lateral wall provided in a front portion of the motor housing. Rotor supporting members are independently supported by the bearing. Eccentric rotation of the crank shaft resulting from explosive vibrations of the engine is counteracted by two flex plates. Owing to a predetermined clearance, one of the rotor supporting members as a separate component is free from the influence of deformation of the torque converter.

19 Claims, 3 Drawing Sheets

HYBRID-VEHICLE DRIVE UNIT

INCORPORATION BY REFERENCE

The disclosure of Japanese Patent Application No. 2000-292979 filed on Sep. 26, 2000 is incorporated herein by reference in its entirety.

BACKGROUND OF THE INVENTION

1. Field of the Invention

The invention relates to a drive unit for a parallel-type hybrid vehicle wherein an engine and a motor are coupled for use as a power source, and more particularly to a hybrid-vehicle drive unit wherein a motor is fitted to an automatic transmission having a hydraulic power transmission.

2. Description of Related Art

Japanese Patent Application Laid-Open No. ("Kokai") HEI 9-215270, discloses a drive unit for a parallel-type hybrid vehicle wherein a motor-generator is fitted to an automatic transmission equipped with a torque converter. The driving force of the motor-generator assists the driving force of the engine e.g. when the vehicle starts from a standstill or is accelerated. The motor-generator functions as a generator to supplement the effect of the engine brake when the vehicle runs down a slope or is braked, and wherein braking energy is regenerated to improve fuel efficiency and reduce exhaust emissions. Similar hybrid vehicle drive trains are disclosed in Japanese Patent Application Laid-Open No. ("Kokai") HEI 5-30605, and Japanese Patent Application Laid-Open No. ("Kokai") HEI 5-024447.

According to Kokai 9-215270, a motor housing for a motor-generator is sandwiched between an engine and a transmission housing containing the transmission and a torque converter. According to Kokai 5-30605, a motor-generator is disposed in a bypass between a turbine runner and a pump impeller of a torque converter. According to Kokai 5-024447, a motor-generator is directly mounted radially outside of a torque converter. Namely, the motor-generator is disposed in an automatic transmission that has substantially the same structure as a conventional automatic transmission, with a rotor supported radially outward of the cover of the torque converter.

In an internal combustion engine, pistons reciprocate due to explosive combustion of a fuel-air mixture in cylinder chambers to rotate a crank shaft. However, vibrations due to combustive explosion cause the crank shaft to rotate eccentrically (with deflection), preventing centering precision.

On the other hand, the efficiency of the motor-generator is enhanced in proportion to a decrease in clearance (air gap) between its stator and rotor, which, in turn, requires an increase in precision in radial support of the rotor, i.e., centering precision. Further, since the output of the motor-generator increases in proportion to an increase in the axial length of opposing surfaces of the stator and the rotor, the efficiency of the motor-generator is also greatly affected by precision in axial support of the rotor.

If the rotor is directly coupled to the crank shaft as in Kokai 9-215270, centering precision of the crank shaft directly affects centering precision of the rotor. Thus, the rotor needs to have an excess of air gap corresponding to the degree of eccentricity caused by explosive vibrations. Thus, the motor-generator decreases in efficiency, and requires a corresponding larger capacity.

Further, if the motor-generator is disposed between the turbine and the front cover of the torque converter as disclosed in Kokai 5-30605, the front cover is directly coupled with the crank shaft. Thus, centering precision of the crank shaft directly affects precision of the support position of the rotor. Also, since the torque converter undergoes deformation such as expansion or contraction due to changes in inlet pressure and centrifugal hydraulic pressure, the stator fixed to the pump impeller and the rotor fixed to the turbine runner are axially displaced relative to each other, and the motor suffers a corresponding decrease in efficiency. Thus, in order to obtain the required output, to offset the decrease in efficiency of the motor-generator, the motor-generator must be enlarged.

Further, if the motor-generator is directly mounted radially outside of the torque converter as disclosed in Kokai 5-024447, it is difficult to enlarge the diameter of the motor-generator owing to spatial restrictions such as vehicle height. It is difficult to provide a motor (generator) having the necessary output torque within such a limited space. Further, since the rotor of the motor-generator is directly supported radially outside of the cover of the torque converter, when the torque converter undergoes deformation, i.e., expansion or contraction due to changes in inlet pressure or centrifugal hydraulic pressure, there is the possibility of interference between the stator and the rotor. Thus, the rotor needs an excessive air gap corresponding to the expansion or contraction of the torque converter and the efficiency of the motor-generator is thereby decreased and requires a corresponding increase in capacity.

Further, the torque converter generates a great amount of heat. Thus, if the torque converter is integrated with the rotor, the permanent magnet of the motor may by demagnetized by heat from the torque converter. Furthermore, if the lock-up clutch and the rotor are located close to each other, the cover integrated with the rotor is magnetized due to the magnetic flux emitted from the permanent magnet of the rotor. As a result, iron powder dispersed in hydraulic fluid in the torque converter may accumulate in the lock-up clutch and obstruct operation of the lock-up clutch.

SUMMARY OF THE INVENTION

Thus an object of the invention is to provide a hybrid-vehicle drive unit capable of supporting a motor-generator with high precision, improving the efficiency of the motor-generator, and reducing the size of the motor-generator with independence from the influence of centering precision of the crank shaft of an engine, from deformation of the hydraulic power transmission, and so on.

To achieve the above-stated object, according to one aspect of the invention, there is provided a hybrid-vehicle drive unit comprising an engine, an automatic transmission having a hydraulic power transmission and an automatic speed-change mechanism, and a motor having a stator and a rotor that is coupled to an input section of the hydraulic power transmission. A motor housing for the motor is disposed between a housing of the hydraulic power transmission and the engine. The stator is fixed to the motor housing. The rotor is rotatably supported by the motor housing, and is disposed radially outside of the hydraulic power transmission with a predetermined clearance.

In the above arrangement, the rotor of the motor is independently supported by the housing of the motor, e.g., via the bearing, isolated from any affect of eccentric rotation of the crank shaft resulting from explosive vibrations of the engine or deformation of the hydraulic power transmission resulting from changes in inlet(charging) pressure or centrifugal hydraulic pressure.

According to the above aspect of the invention, the motor is separated with the stator fixed to the motor housing and with the rotor rotatably supported by the motor housing, and a predetermined clearance is left between the rotor and the torque converter. Thus, it is possible to provide support with high centering precision without influence by eccentric rotation of the crank shaft. The above-described construction also ensures a clearance (air gap) of high precision by preventing the rotor and the stator from interfering with each other due to expansion or contraction of the torque converter caused by changes in centrifugal hydraulic pressure and so on. Thus, the efficiency of the motor can be enhanced by narrowing (decreasing) the clearance, and the functions as described above can be performed reliably with a relatively compact structure. Further, since the predetermined clearance exists between the rotor and the torque converter, the permanent magnet is prevented from demagnetizing due to generation of heat within the torque converter. Furthermore, since the lock-up clutch and the rotor, which are disposed in the front cover of the torque converter, are located far from each other, trash such as iron powder can be prevented from flaking off the permanent magnet of the rotor and accumulating in the lock-up clutch. Thus, the lock-up clutch can operate without hindrance.

In the above aspect of the invention, the hydraulic power transmission may have a lock-up clutch and a front cover that is integrated with an outer shell of a pump impeller and that covers a turbine runner and the lock-up clutch, and a supporting member for supporting the rotor may be provided on the engine side of the front cover with a predetermined clearance and may be rotatably supported by a bearing fitted to the motor housing.

According to this construction, the motor is separated from the hydraulic power transmission by the front cover and isolated from hydraulic fluid in the hydraulic power transmission. Therefore, the motor can be prevented from loss of efficiency due to contact with the hydraulic fluid. Furthermore, the rotor is supported by the supporting member spaced from the front cover by the predetermined clearance. Thus, the influence of deformation of the hydraulic power transmission resulting from changes in charging pressure or centrifugal hydraulic pressure can be eliminated more reliably. By increasing the axial length (cumulative thickness) of the rotor, the required performance of the motor as described above can be guaranteed without increasing the dimensions of the motor.

In the above aspect of the invention, the motor housing may have a lateral wall that defines the engine side of the motor, and the bearing may be fitted to a radially innermost (distal) end of the lateral wall. The supporting member for supporting the rotor may be coupled to the front cover. According to this construction, the motor is separated on the engine side by the lateral wall, and the bearing for supporting the rotor is fitted to the distal end of the lateral wall. Therefore, the motor is covered on the engine side thereof with the lateral wall and thus is protected from water and dust. Thus, the lateral wall serves as a cover as well as the rotor supporting member, whereby the drive unit can be made compact as a whole.

In the above aspect of the invention, the hydraulic power transmission may have a front cover that is integrated with an outer shell of a pump impeller and that covers a turbine runner. A center piece may be integrated with the front cover, and may be opposed to a crank shaft of the engine with a clearance therebetween or the center piece and the crank shaft may be coupled with each other via an impact absorbing member.

In the latter construction, the center piece and the crank shaft are separated from each other by the clearance with their edges cut off, and are coupled with each other by the impact absorbing member. Therefore, explosive vibrations of the engine are absorbed by the impact absorbing member and thus are prevented from being propagated toward the rotor, so that high precision in support of the rotor is guaranteed. Also, the radial load applied to the bearing is reduced, whereby durability of the bearing can be improved.

In the above aspect of the invention, the center piece may be spline-fitted with a plate hub that is linked with the crank shaft via the impact absorbing member, and the spline-fitting may be a press-fit engagement of a lead spline with a straight-tooth spline. According to this construction, the plate hub and the center piece are integrated with each other with no play therebetween through press-fitting engagement of the splines. Thus, fretting abrasion otherwise produced by explosive vibrations of the engine can be prevented.

In the above aspect of the invention, a hub of the supporting member for supporting the rotor may be fitted to the center piece. The hub of the supporting member may be fastened by a nut screwed onto threading formed in the center piece, and may be integrally press-fitted to and coupled with the front cover. Thus, fretting abrasion due to looseness between the tooth flanks of the splines can be prevented. The motor-generator can be reliably protected from adverse affect of aerugo powder and so on.

In the above aspect of the invention, the hydraulic power transmission may be interposed between a crank shaft of the engine and an input shaft of the automatic speed-change mechanism and may have a lock-up clutch that connects a turbine runner with a pump impeller. The lock-up clutch may be located closer to the engine than the torus of the hydraulic power transmission and may have a smaller diameter than the outside diameter of the torus. The motor may be disposed radially outward of the lock-up clutch at a position that at least partly axially overlaps the lock-up clutch.

According to this latter construction, since the motor is disposed so as to axially overlap with the lock-up clutch, the overall axial dimension need not be lengthened, and thus good mountability on the vehicle is guaranteed. Also, since the motor is disposed radially outward of the lock-up clutch, i.e., at a position closer to the engine than the torus of the hydraulic power transmission, the hydraulic power transmission can be ensured of a sufficient capacity. Further, the motor is ensured of good mountability on the vehicle, e.g., sufficient road clearance, and has an appropriate radial dimension. Sufficient output of the motor is guaranteed, whereby the starting performance and the vehicle driving performance of the engine can be improved.

The lock-up clutch may be a multiple-plate clutch which allows the lock-up clutch to be reduced in diameter to accommodate the motor disposed radially outside thereof. Because the lock-up clutch is a multi-plate clutch, sufficient torque capacity can be guaranteed.

The lock-up clutch may have a spring damper composed of circumferentially arranged coil springs, and the spring damper may be disposed radially inside the frictional plate portion of the lock-up clutch at such a position that at least part of the spring damper axially overlaps the lock-up clutch. According to this construction, the spring damper is disposed radially inside of the friction plates of the lock-up clutch. Because no additional axial dimension to accommodate the spring damper is required, the drive unit need not be increased in total length.

In the above aspect of the invention, the hydraulic power transmission may have a front cover that covers the turbine runner and the lock-up clutch and that couples the pump impeller with the crank shaft and the rotor. The front cover may have an axially extending intermediate portion. The motor may be disposed radially outward of the intermediate portion, and the lock-up clutch may be disposed radially inside of the intermediate portion. Thus, the motor can be protected against loss of efficiency due to contact with hydraulic fluid by separating the motor from the lock-up clutch with the front cover and isolating the motor from the hydraulic fluid in inner portions of the hydraulic power transmission. At the same time, the radial dimension need not be increased to allow a reduction of the axial dimension.

A sensor for detecting a rotational position of the rotor may be disposed radially inside of the stator at a position that is substantially axially aligned with the lock-up clutch. Since the sensor detects the rotational position of the rotor, the efficiency of the motor can be improved. While the motor can be reliably prevented from rotating in reverse when the engine is being started, no additional axial space for installation of the sensor is required. Thus, the drive unit need not be increased in total length.

In the above aspect of the invention, the motor may be stored in a motor housing, and the stator may be fixed to the motor housing. The motor housing may be disposed between the engine and a housing containing the hydraulic power transmission. Since the motor housing for storing the motor is disposed between the engine and the housing for the hydraulic power transmission, there is no need to modify the torus of the hydraulic power transmission or the speed-change mechanism. Also, the motor including the motor housing can be constructed as a sub-assembly. Further, it is possible to manufacture the drive unit relatively easily without substantial modification of pre-existing conventional production lines, and provide flexible applicability to a great variety of engines and vehicles.

The hydraulic power transmission may be a torque converter including a turbine runner, a pump impeller and stator, whereby the torque of the vehicle is increased by the torque converter during takeoff. Thus, the vehicle can be reliably started in motion by means of the motor.

The motor may be a motor-generator that also functions as a generator. The motor-generator is directly coupled to the crank shaft of the engine, whereby the wheels are driven by the motor either by itself or in cooperation with the internal combustion engine. The motor-generator also functions as a generator for increasing the effect of an engine brake and performing the function of regeneration brake. Furthermore, the motor-generator also functions as a starter motor for starting the internal combustion engine. Thus, with a simple construction that does not necessitate any special starter motor, the engine need not be run at idle. In combination with the above functions of driving the vehicle and applying a regeneration brake, it becomes possible to reduce exhaust emissions and further improve fuel efficiency.

The predetermined clearance between the rotor and the hydraulic power transmission may be 0.8 to 3.5 mm whereby the rotor can be reliably prevented from being pressed by and interfering with the stator due to deformation of the hydraulic power transmission resulting from changes in centrifugal hydraulic pressure and so on. Also, the motor housing need not be increased in size. Further, the clearance makes it possible to prevent the permanent magnet from becoming demagnetized due to generation of heat by the torque converter. Furthermore, the clearance makes it possible to prevent trash such as iron powder from flaking off the permanent magnet of the rotor and accumulating in the lock-up clutch disposed in the front cover of the torque converter. As a result, the lock-up clutch can operate without hindrance.

DETAILED DESCRIPTION OF PREFERRED EMBODIMENT

A preferred embodiment of the invention will now be described with reference to the drawings.

Figure 1:
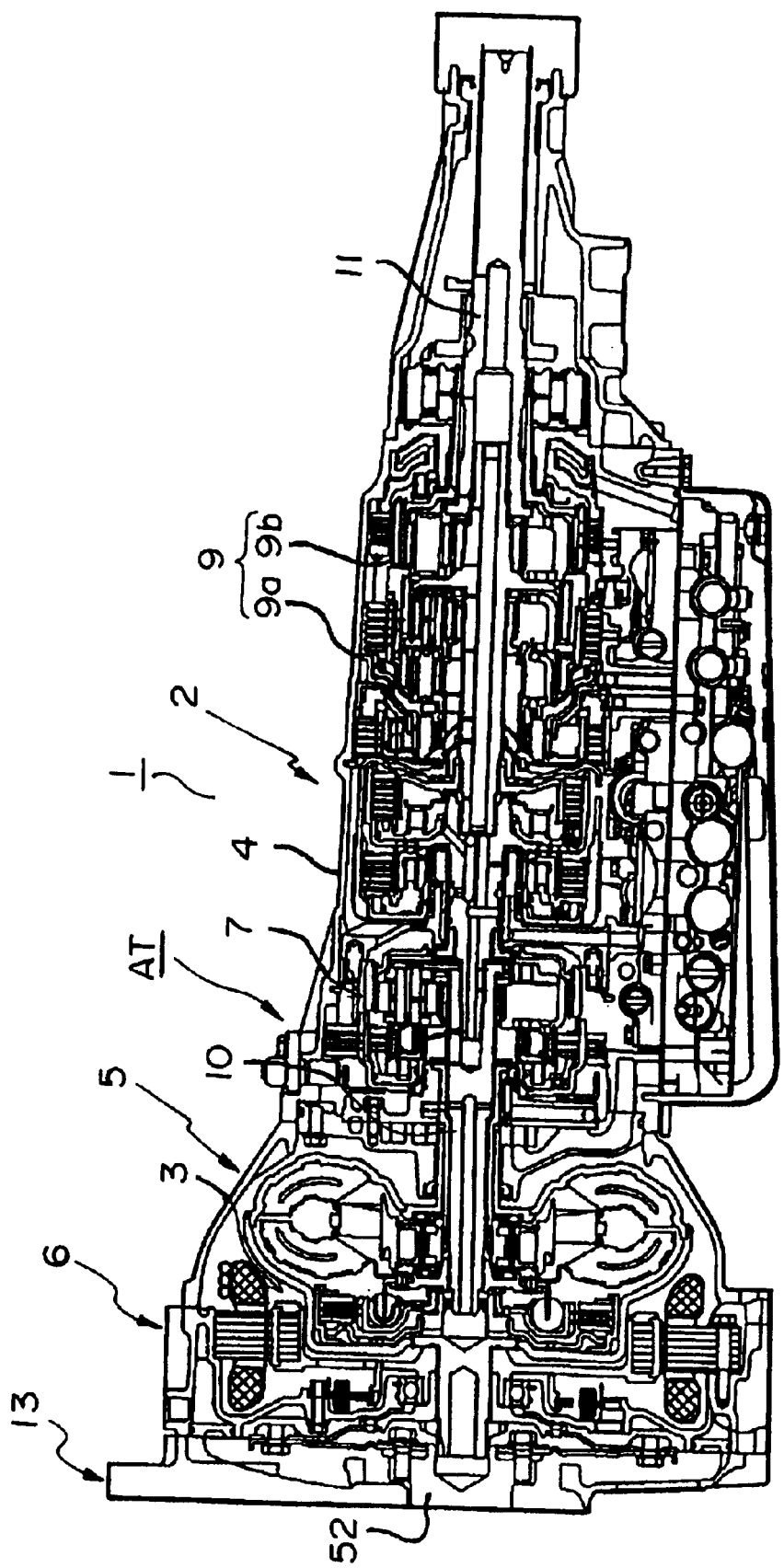
FIG. 1 is an overall cross-sectional view of a hybrid-vehicle drive unit to which the invention has been applied.

FIG. 1 shows a hybrid-vehicle drive unit 1 as including a multiple-stage transmission 2 housed in a transmission case 4, a torque converter 5 having a lock-up clutch 3, and a motor-generator 6 in the form of a brushless DC motor. At the left-side of FIG. 1, the hybrid-vehicle drive unit 1 is connected with an internal combustion engine 13 such as a gasoline engine. Thus, the hybrid-vehicle drive unit 1 includes a conventional automatic transmission AT with its torque converter, additionally equipped with the motor-generator 6.

The hybrid-vehicle drive unit 1 is arranged in a single-axis manner and is applied to a front-engine rear-drive (FR) type. More specifically, in order from the engine side, the motor-generator 6, the torque converter 5 and the automatic speed-change mechanism 2 are arranged on a single axis. In the automatic speed-change mechanism 2, an over-drive mechanism 7 constructed of a single simple planetary gear and a main speed-change mechanism 9 composed of a Simpson-type planetary gear unit 9a and a single simple planetary gear 9b are arranged in this order from the side of the torque converter 5. The automatic speed-change mechanism 2 changes the rotational speed of an input shaft 10 into one of five forward speeds or one reverse speed and outputs it to an output shaft 11.

Figure 2:
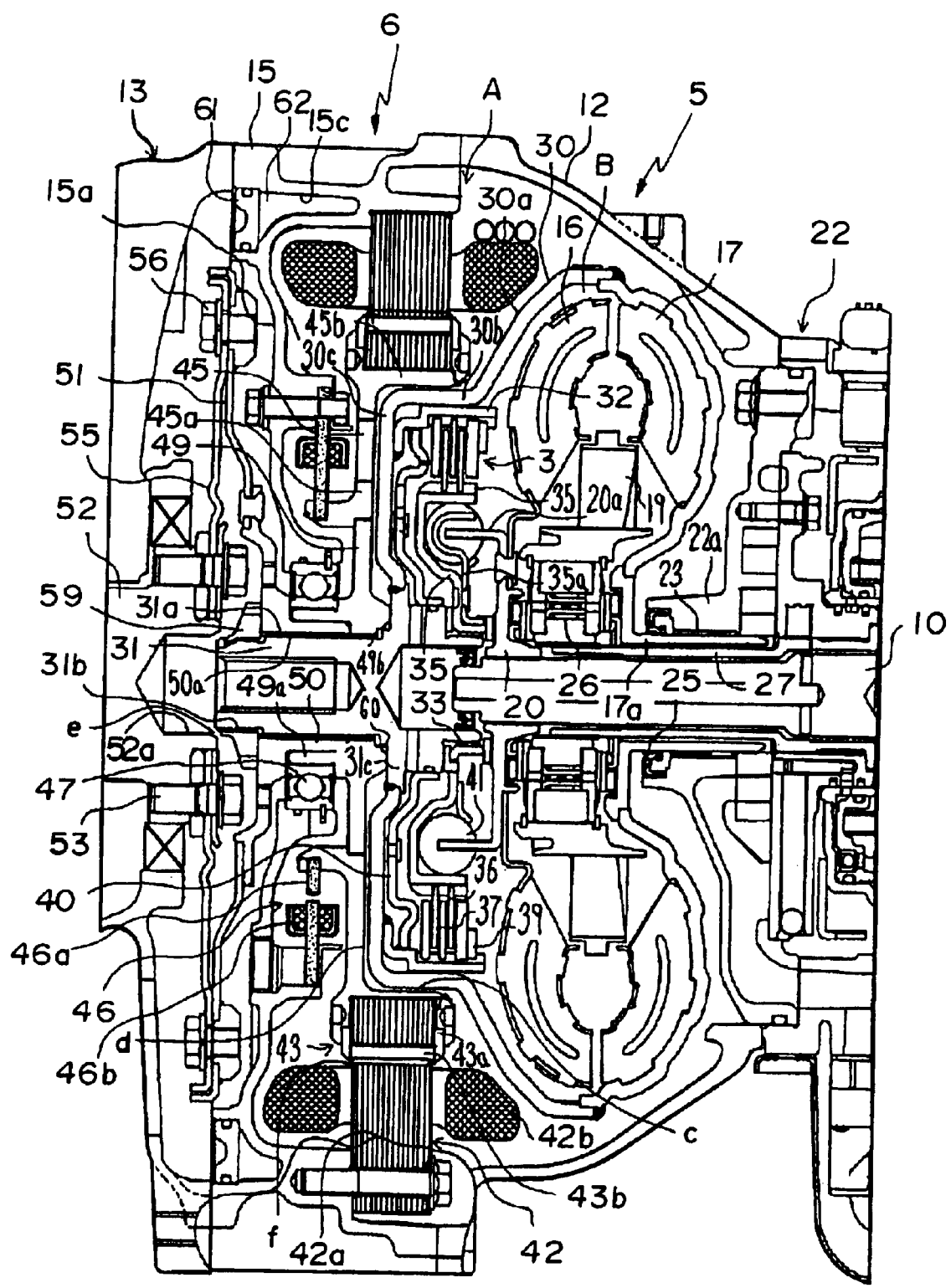
FIG. 2 is a cross-sectional view of an essential part of the drive unit of FIG. 1, i.e., the torque converter and motor-generator.

FIG. 2 shows an essential part of the hybrid-vehicle drive unit 1, i.e., the torque converter 5 and the motor-generator 6 that are arranged coaxially with a motor housing 15 sandwiched between a converter housing 12 and the internal combustion engine 13. The torque converter 5 has a turbine runner 16, a pump impeller 17 and a stator 19. The turbine runner 16 is coupled with a hub 20, which is spline-connected with the input shaft 10 at a front end thereof. Further, an oil pump 22 is disposed between the converter housing 12 and the transmission case 4 of the automatic speed-change mechanism 2, and a pump case 22a is fixed to the housing 12 and to the case 4.

A hub 17a fixed to the base of the pump impeller 17 is rotatably supported around the inner periphery of the pump case 22a by a bush 23, and an oil seal 25 is disposed between the case 22a and the hub 17a. Further, the stator 19 is coupled with a one-way clutch 26 that has an inner race fixed to the oil pump 22 via a stator shaft 27 disposed between the input shaft 10 and the hub 17a.

A front cover 30 fixed to the pump impeller 17 is composed of a radially outer portion 30a, an intermediate portion 30b and a radially inner portion 30c. The radially outer portion 30a extends diagonally and is smoothly curved along the outer periphery of the turbine runner 16. The intermediate portion 30b extends substantially parallel to the rotational axis of the torque converter, toward the engine (forward). The radially inner portion 30c extends substantially in the radial direction from its inner periphery where it is fixed to a center piece 31. Center piece 31 extends forward along the axial rotational axis so as to be axially aligned with the input shaft 10.

The lock-up clutch 3 is disposed radially inward of the intermediate cover portion 30b. The lock-up clutch 3 has a drum 32 fixed to the radially inner portion 30c of the front cover 30 and extending in the axial direction along the intermediate portion 30b, a hub 35 supported at a rear end of the center piece 31 via a needle bearing 33, and a plurality of frictional members 36 and outer frictional plates 37 respectively engaging splines of the hub 35 and the drum 32. Furthermore, the rearmost one of the outer frictional plates 37 is prevented from axial displacement by a snap ring 39, and the frontmost one of the outer frictional plates 37 abuts a piston plate 40. Thus, the lock-up clutch 3 is constructed with a smaller diameter than that of the torus defined by the outer shells of the pump impeller 17 and the turbine runner 16 of the torque converter 5. More specifically, the lock-up clutch 3 is constructed as a multi-plate clutch and is disposed such that the drum 32 is located substantially in the radially central portion of the torus.

The piston plate 40 is axially movable to engage, release or slip-control the lock-up clutch 3. The piston plate 40 is provided with an orifice which allows hydraulic fluid to flow between hydraulic chambers separated by the piston plate 40 while being throttled. By changing the direction of flow of the hydraulic fluid, the piston plate 40 can control the lock-up clutch 3. Furthermore, a plurality of damper springs 41 in the form of coil springs are circumferentially disposed radially inward of the inner-frictional-plate engaging splines of the hub 35, i.e., radially inside the lock-up clutch 3. The damper springs 41 are disposed in their compressed states between a plate 35a fixed to the hub 35 and a lug 20a of a turbine hub 20. That is, the damper springs 41 are disposed at substantially radially aligned positions radially inward of the frictional plates 36, 37 of the lock-up clutch 3, i.e., at positions axially overlapping the frictional plates of the lock-up clutch 3.

The moto-generator 6 has a stator 42 and a rotor 43, which are disposed at substantially radially aligned positions, radially outward of the axially extending intermediate portion 30b of the front cover 30, i.e., at positions axially overlapping with the lock-up clutch 3. The rotor 43 is constructed of a plurality of laminate sheets 43a arranged axially on a permanent magnet 43b. These laminate sheets are fixed to and supported by a rotor plate (or "supporting member") 45. The rotor plate 45 has a circular portion 45a that radially extends in front of, at a predetermined distance d from, and in parallel with the cover portion 30c. The rotor plate 45 further includes a holding portion 45b that holds the laminate sheets 43a. Holding portion 45b is joined to the circular plate portion 45a, and axially extends in such a manner as to cover the intermediate portion 30b of the front cover 30, spaced at a predetermined distance c (to tbe described later in detail) therefrom.

The stator 42 is composed of a multitude of axially laminated core members 42a and a coil 42b wound around them, and is fixed to the motor housing 15. The rotor 43 and the stator 42 are arranged with the laminate sheets 43a and the core members 42a located at the same axial position (axially overlapping), i.e., are radially aligned within a predetermined axial length. The laminate sheets 43a and the core members 42a are radially opposed to each other with a narrow clearance (air gap) therebetween. The stator 42 of the motor-generator 6 is of the greatest possible dimension allowed by the vehicle, e.g., that allows a sufficient road clearance. Also, by increasing the number of poles, a predetermined output is ensured, and the magnetic laminate sheets 43a of the rotor 43 are sufficiently rigid to endure centrifugal forces to which they are subjected.

Further, the motor housing 15 has a lateral wall 15a extending along a front portion of the stator 42. A resolver 46, which is a sensor for detecting the rotational position of the rotor 43, is provided between an intermediate portion of the lateral wall 15a and the rotor plate 45. The resolver 46 is designed to precisely detect the rotational position of the rotor 43 of the brushless DC motor 6 and to control the timing when electric current flows through the stator 42, and is composed of a rotor 46a and a stator 46b, each of which is constructed of precision-formed laminate sheets. The stator 46b excited by the coil is disposed radially aligned with and radially outward of the rotor 46a so that the stator 46b and the rotor 46a axially overlap. The resolver 46 is disposed radially inward of the stator coil 42b and is substantially axially aligned with the lock-up clutch 3.

A ball bearing 47 is fitted to the free (innermost) end of the lateral wall 15a of the motor housing 15. The ball bearing 47 is disposed at a position that is radially inward of the resolver 46 and is substantially radially aligned therewith (i.e., axially overlaps therewith). A hub 49 is fixed to the inner circumference of the rotor supporting plate 45 and has an axial extension 49a which is press-fit within the ball bearing 47. An input-plate boss portion 50 is fitted within the inner circumferential surface of extension 49a with almost no clearance, i.e., with a close tolerance, although not press-fitted. An input plate 51 is fixed to the boss portion 50 and extends radially therefrom. Further, a drive plate 55 is fixed to a leading end of a crank shaft 52 of the engine by means of a bolt 53. These plates 55, 51 both have flexibility, and are fixed to and coupled with each other near their outer periphery by means of bolts 56.

Figure 3:
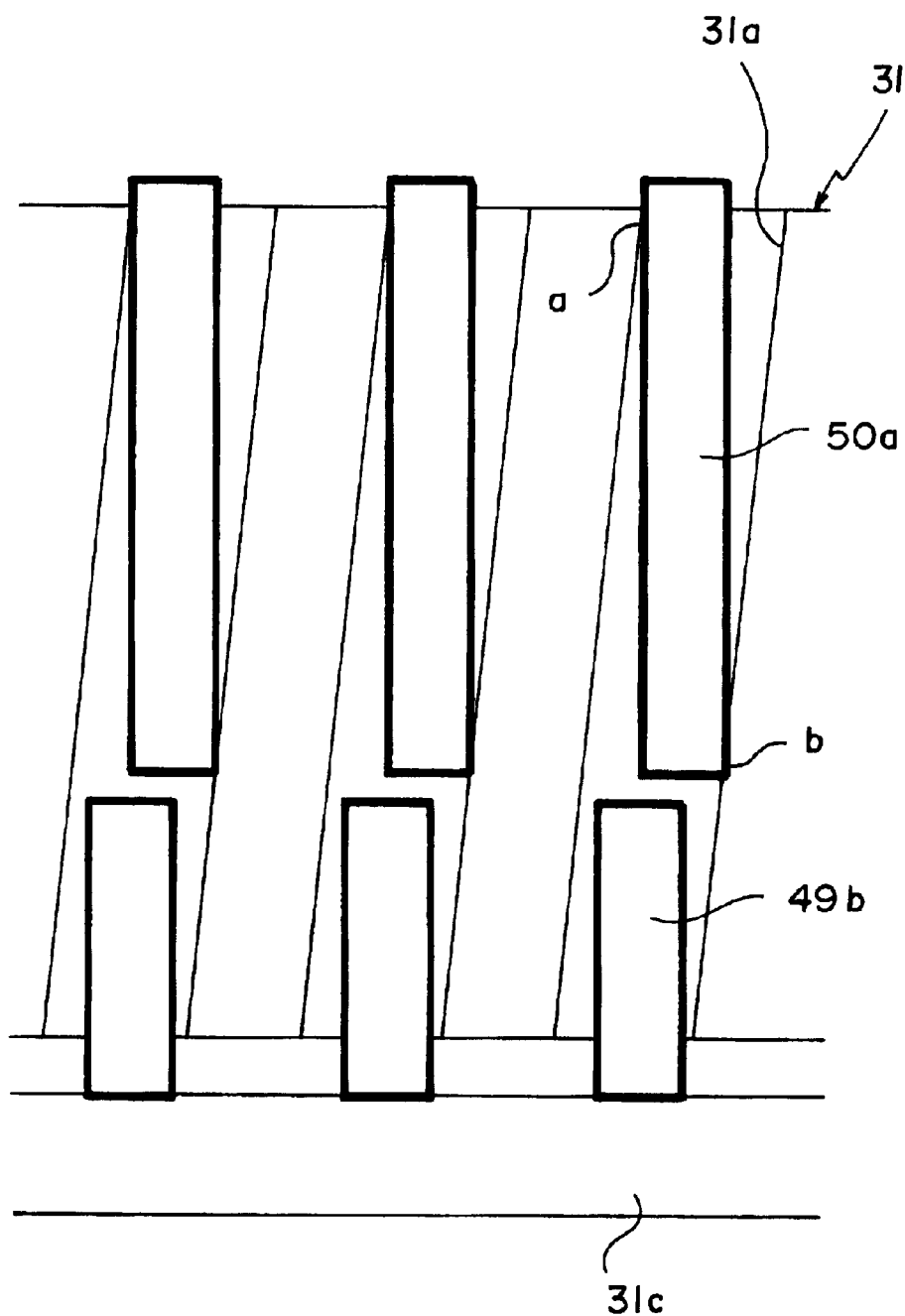
FIG. 3 is an expanded plan view of a splined center piece, and an input plate hub spline and a rotor hub spline shown engaged with the splines of the center piece.

The center piece 31 does not extend into a leading end recess 52a of the crank shaft 52 but, rather, has its distal end facing the leading end recess 52a with a sufficient clearance e. As shown in detail in FIG. 3, splines 31a inclined at a predetermined angle θ are formed along the outer periphery of the center piece 31. Straight-tooth splines 50a extending in the axial direction are formed along the entire inner surface of the input plate hub 50. Further, a relatively short straight-tooth spline 49b, also extending in the axial direction, is formed along part of the rear side of the inner surface of the rotor hub 49. A thread groove 31b of a predetermined length is formed in a front end of the center piece 31 and a nut 59 is screwed onto the thread groove 31b.

With the splines 49b of the rotor hub 49 and the spline 50a of the input plate hub 50 engaging the spline 31a of the center piece 31, the nut 59 is fastened. Thereby, as shown in detail in FIG. 3, the relatively long input plate hub spline 50a composed of straight teeth has opposed tooth flanks a, b press-fitted onto adjacent tooth flanks of the inclined spline 31a of the center piece 31. The spline 50a and the spline 31a are closely press-fitted to each other with no play therebetween, and rotate together while preventing abrasion that would otherwise result from an engagement gap between the spline teeth.

As noted above, the relatively short rotor hub splines 49b, in the form of straight teeth, are also in engagement with the splines 31a. Because the splines 49b are short and thus loosely fitted to the spline 31a with a gap between their tooth flanks, the rotor hub 49 can be easily mounted independently of the press-fitting of the input plate hub splines 50a. Because the rotor hub 49 is axially movable due to the loose fit between the splines 49b and the splines 31a, it is tightly sandwiched between the input plate hub 50 and a flange portion 31c of the center piece 31, by tightening the nut 59. Thereby the rotor hub 49 rotates integrally with the center piece 31 and the input plate hub 50, notwithstanding the looseness between the tooth flanks of the splines 49b and the splines 31a.

A space between the rotor hub 49 and the front cover 30 is sealed by an O-ring 60. Because the ball bearing 47 has a seal 25 and because the seal 25 is disposed between the pump case 22a and the hub 17a, the motor chamber A, which is defined by the pump case 22 and the case of the torque converter 5, i.e., the front cover 30 and the outer shell of the pump impeller 17, is a waterproof, oil-retaining and dustproof structure. The lateral wall 15a of the motor housing 15 serves as a support for the rotor 43 via the ball bearing 47 as well as a cover member for covering the front part of the motor-generator 6. That is, the lateral wall 15a performs both functions and thus contributes to compactness of the apparatus. Further, an annular recess 15c is formed in the motor housing 15 and closed in a waterproof manner by an annular lid member 61 to form a coolant passage 62. Engine coolant circulates through the coolant passage 62 to prevent the motor chamber A from overheating.

As described above, the lock-up clutch 3 has been reduced in diameter, and the motor-generator 6 is disposed radially outward of and substantially radially aligned with the lock-up clutch 3. Furthermore, the damper springs 41 are disposed radially inward of the lock-up clutch 3 and substantially radially aligned therewith. The resolver 46 is disposed radially inward of the front portion of the coil 42b of the motor-generator 6 and is substantially axially aligned with the lock-up clutch 3. The lateral wall 15a of the motor housing 15 serves both as a cover member and as a rotor supporting member. The motor-generator 6 is independently supported by the motor case 15, whereby the overall efficiency is improved. Because of the foregoing arrangement, the motor-generator 6 can be mounted on the automatic transmission without substantially enlarging its axial or radial dimension. To be more specific, the motor-generator 6 has its radial dimension approximately equal to that of the torque converter housing 12 of the related art and only a slightly increased axial dimension.

Furthermore, since there is a predetermined clearance c (e.g., 2 mm) between the intermediate portion 30b of the front cover 30 of the torque converter 5 and the holding portion 45b of the plate 45 of the rotor 43, the rotor 43 and the stator 42 are prevented from interfering with each other while being pressed and deformed due to centrifugal hydraulic pressure and so on in the torque converter 5, which will be described later in detail. Thus, even though a gap f between the rotor 43 and the stator 42 has been further narrowed, it is possible to maintain the gap f with high precision and further improve the efficiency of the motor-generator 6. Further, the torque converter 5 generates a great amount of heat and thus may demagnetize the laminate sheets 43a of the permanent magnet 43b of the rotor 43. However, because of the predetermined clearance c, i.e., because the front cover 30 and the rotor 43 are out of contact with each other and thus do not allow heat conduction, the magnetic function is retained undiminished. Furthermore, the predetermined clearance c makes it is possible to prevent trash such as iron powder from accumulating in the lock-up clutch 3 due to the magnetic flux emitted from the laminate sheets 43a in the permanent magnet 43b, and guarantees unhindered operation of the lock-up clutch 3.

Next, operation of the hybrid-vehicle drive unit 1 will be described. When the ignition switch has been turned on, if the driver has depressed the accelerator pedal with the intention of starting the vehicle in motion, first the motor-generator 6 is supplied with electric current from a battery (not shown) and functions as a motor. Based on precise detection of the position of the rotor 43 by means of the resolver 46, the brushless DC motor-generator 6 adjusts (through a controller—not shown) the timing when electric current flows through the coil 42b of the stator 42, so that the rotor 43 rotates forward with high efficiency. Rotation of the rotor 43 is transmitted through the rotor supporting plate 45 and the rotor hub 49, to the center piece 31 due to the frictional clamping force that acts between the input plate hub 50, the hub 49 the flange portion 31c of the center piece 31 based on the tightness of the nut 59. Accompanied by a predetermined increase in torque ratio, this rotation is further transmitted to the input shaft 10 via the torque converter 5 composed of the front cover 30, the pump impeller 17, the turbine runner 16 and the stator 19.

When the vehicle takes off, no ignition plug has yet been supplied with electric current and the fuel injection system is not in operation. More specifically, although the crank shaft 52 is rotated via the input plate hub 50, input plate 51 and the drive plate 55, driven by rotation of the rotor hub 49, air in cylinder chambers is simply compressed and released by the pistons while the engine is in its idling state. Thus, the vehicle takes off and runs smoothly with a predetermined torque as determined by the driving characteristics of the brushless DC motor 6 that outputs high torque at low engine speed, as well as the high torque ratio resulting from an increase in torque ratio by the torque converter 5 and establishment of the first-speed stage in the automatic speed-change mechanism 2.

Then, if the motor-generator 6 produces a rotational speed suited for the starting of the engine, the ignition plug is ignited and the fuel injection system is activated to start the internal combustion engine 13. Torque of the crank shaft 52 of the internal combustion engine 13 is transmitted to the drive plate 55, the input plate 51, the hub 50, and the center piece 31 with the spline 31a press-fitted to the straight-tooth spline 50a. In this state, driving force of the internal combustion engine 13 and the driving force of the motor-generator 6 functioning as a motor are combined and the sum is transmitted to the torque converter 5. Furthermore, the automatic speed-change mechanism 2 is upshifted so that a desired rotational speed is transmitted to driven wheels. That is, if a great driving force is required e.g. when the vehicle is accelerated or runs up a slope, the driving force of the motor-generator 6 assists the driving force of the internal combustion engine 13 so that the vehicle runs at a high horsepower.

If the vehicle continues a constant high-speed running state, the electric current to motor-generator 6 is stopped so that the motor-generator 6 rotates idly and the vehicle is driven exclusively by the power of the engine. When the vehicle is driven by the internal combustion engine 13, with or without assist by the motor, the direction of application of a converter pressure is changed to displace the piston plate 40 and engage the lock-up clutch 3. In this manner, the torque that has been transmitted to the front cover 30 is transmitted directly to the input shaft 10, not via the hydraulic fluid in the torque converter 5, but via the drum 32, the outer frictional plates 37, the inner frictional plates 36, the hub 35, the damper springs 41 and the turbine hub 20.

As described above, the lock-up clutch 3 is reduced in diameter due to the arrangement of the motor-generator 6. However, the lock-up clutch 3 is constructed of a multiple-plate clutch and has a sufficient torque capacity even for the high horsepower achieved by the assist from the motor. Thus, the lock-up clutch 3 reliably transmits driving forces of the internal combustion engine 13 and the motor to the input shaft 10. Further, given the structure of the piston plate 40, the lock-up clutch 3 facilitates slip control in many speed-change stages.

Further, if the output of the internal combustion engine 13 is more than sufficient, e.g., when the vehicle runs at a constant low speed or runs down a slope, operation of the motor-generator is changed so that the motor-generator 6 functions as a generator to charge the battery, e.g., by switching the coil 42b of the stator 42 to a charging circuit and controlling the off-period of a switch for the chopper. Especially, if an engine brake is required when the vehicle runs down a slope, regenerative power of the motor-generator 6 functioning as a generator is increased so as to achieve a sufficient engine brake. Further, if a driver depresses a foot brake with the intention of stopping or slowing the vehicle, regenerative power of the motor-generator 6 is further increased so that the motor-generator 6 operates as a regenerative brake. Thus, inertial energy of the vehicle is regenerated as electric power, and the amount of energy that is dissipated as heat based on frictional braking is reduced.

If the vehicle has been stopped e.g. while waiting for a traffic light to turn green, both the motor-generator 6 and the internal combustion engine 13 are turned off. That is, the engine does not assume an idling state as in the related art. As described above, when the vehicle takes off from its stopped state, it takes off first under the motor power of the motor-generator 6. Then, if the vehicle starts running at a relatively low speed immediately thereafter, the engine is started by the motor driving force. The driving force of the engine is prevented from sudden fluctuations by assist of the driving force of the motor 6, so that the vehicle runs smoothly. Then, if an engine brake is required or if the vehicle has been braked to a halt, inertial energy of the vehicle is regenerated as electric energy by using the motor-generator 6 as a regeneration brake. As a result of these operations, the hybrid vehicle of the invention can achieve good fuel efficiency and reduced exhaust emissions.

In the internal combustion engine 13, the pistons reciprocate due to explosion in the cylinder chambers, and the reciprocating movements of the pistons are transmitted to the crank shaft 52 as rotation. Therefore, the crank shaft 52 rotates eccentrically as a result of the explosive vibrations of the pistons and thus is inevitably susceptible to deterioration in alignment (centering) precision. On the other hand, the motor-generator 6 is disposed in the separate motor housing 15 that is sandwiched between the engine 13 and the converter housing 12, and the rotor 43 is supported by the motor housing 15 via the bearing 47. More specifically, the axial extension 49a of the rotor hub 49 is press-fitted with and radially supported by the ball bearing 47 that has been fitted to the lateral wall 15a of the housing 15.

The crank shaft 52 is coupled with the rotor hub 49 via the input plate 51, the drive plate 55 and so on. However, eccentric rotation of the crank shaft 52, due to explosive vibrations of the engine, is counteracted by deflection of the drive plate 55 and the input plate 51, which constitute a flex plate as an impact absorbing member. Thus, the eccentric rotation of the crank shaft 52 is prevented from being directly transmitted to the rotor hub 15. Further, since the crank shaft 52 and the center piece 31 are axially spaced from each other with their edges cut off, they do not influence precision of the independent rotation and support of the rotor 43. Since the stator 42 is directly fixed to the motor housing 15, the rotor 43 and the stator 42 are precisely opposed to each other with a narrow clearance f therebetween. Further, because the explosive vibrations are absorbed by the two plates 51, 55 and because the ball bearing 47 is independently supported by the lateral wall 15a of the motor housing 15, the radial load applied to the ball bearing 47 is low.

On the other hand, the torque converter 5 undergoes deformation such as expansion or contraction due to changes in charging pressure in a converter chamber B defined by the front cover 30 and the outer shell of the pump impeller 17, and due to changes in centrifugal hydraulic pressure resulting from rotation of the pump impeller 17. However, since the front cover 30 and the rotor supporting plate 45 are constructed as separate components with the predetermined clearance c there between, neither do they influence precision of rotation and support of the rotor 43. While the torque converter 5 is deformed due to changes in charging (inlet) pressure and centrifugal hydraulic pressure as described above, however, because the front cover 30 has a robust structure with the axially extending intermediate portion 30b having a stepped configuration, and because the radially inside portion of the front cover 30 is fixed to the axial extension 31c of the center piece 31 and axially supported by the bearing 47 via the rotor hub 49, the nut 59 and so on, the front cover 30 is prevented from expansion forward or radially outwardly beyond the predetermined clearance c and from affecting the rotor supporting plate 45. The front cover 30 is allowed to deform only rearward, which movement is absorbed by a supporting portion of the oil pump 22a.

Thus, the motor-generator 6 is radially and axially supported with high precision, and is located at a position that is radially outward of the reduced diameter lock-up clutch 3 and that does not protrude radially far beyond the outside diameter of the torus of the torque converter 5. Although the motor-generator 6 has a compact structure that is enlarged neither axially nor radially relative to the related art, a relatively high output can be achieved.

Further, even if subtle vibrations of the crank shaft 52 are transmitted to the plate hub 50 via the drive plate 55 and the input plate 51, the straight-tooth splines 50a of the hub 50 and the splines 31a of the center piece 31 are press-fitted to each other and rotate together without looseness. Therefore, a torque can be transmitted without causing fretting abrasion therebetween. Further, the rotor hub 49 is sandwiched between the plate hub 50 and the flange 31c of the center piece 31 due to the fastening of the nut 59, and rotates together therewith without looseness due to the frictional force resulting from the press-fitting of the rotor hub 49 between the plate hub 50 and the flange 31c. Thus, a torque can be transmitted without causing fretting abrasion between the center piece 31 and the rotor hub 49.

Although the above embodiment employs a automatic transmission with five speed stages, other automatic transmissions with four or three speed stages can also be employed. Furthermore, the invention is also applicable not only to automatic transmissions of the F/R type but also to other automatic transmissions, e.g., of the F/F (front-engine front-drive) type. Further, although the above embodiment employs a brushless DC motor as the motor-generator, another motor such as a direct-current motor or an induction alternating-current motor can also be employed. Although the above embodiment employs a torque converter, a fluid coupling can be employed instead. That is, the invention is applicable to any drive unit having a hydraulic power transmission such as a torque converter, a fluid coupling or the like.

Operation of the above embodiment is summarized as follows.

When the vehicle takes off, the motor-generator 6 functions as a motor, and the driving force of the motor is transmitted to the wheels via the torque converter 5 and the automatic speed-change mechanism 2. At this time, the internal combustion engine 13 is rotating idly with the fuel injection system out of operation. Relatively shortly after takeoff of the vehicle, the fuel injection system is activated, and the motor-generator 6 functions as a start motor to start the engine.

Once the internal combustion engine is started, the driving force of the motor-generator 6 assists the driving force of the internal combustion engine 13, thus satisfying any demand for increased horsepower when the vehicle is accelerated or runs up a slope. Then, if the vehicle assumes a constant running state, the motor-generator 6 rotates idly or functions as a generator and thus the vehicle runs only by the driving force of the internal combustion engine 13. Further, when the vehicle runs down a slope, the motor-generator 6 functions as a generator and thus enhances the effect of the engine brake. Furthermore, while the vehicle is being braked, regenerative power of the generator is further increased so that the motor-generator 6 functions as a regeneration brake. If the vehicle has come to a halt, the internal combustion engine 13 is turned off without idling.

The rotor 43 of the motor-generator 6 is independently supported by the lateral wall 15a of the motor housing 15 via the bearing 47 without being affected by the eccentric rotation of the crank shaft 52 resulting from explosive vibrations of the engine or by the deformation of the torque converter resulting from changes in charging pressure or centrifugal hydraulic pressure.

Further, due to engagement of the lock-up clutch 3, the driving force(s) of the internal combustion engine 13 and/or the motor-generator 6 is (are) transmitted to the input shaft 10 of the automatic speed-change mechanism 2 directly, i.e., by-passing the torque converter 5. In this invention, the lock-up clutch 3 has a reduced diameter since the motor-generator 6 is disposed radially outside thereof. However, the lock-up clutch 3 is constructed of a multiple-plate clutch and has a sufficient torque capacity.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A hybrid-vehicle drive unit comprising:
   an engine,
   an automatic transmission including a hydraulic power transmission and an automatic speed-change mechanism; and
   a motor having a stator and a rotor that is coupled with an input portion of the hydraulic power transmission,
   wherein
   a motor housing for the motor is disposed between a housing of the hydraulic power transmission and the engine,
   the stator is fixed to the motor housing,
   the rotor is rotatably supported by the motor housing,
   the hydraulic power transmission includes a front cover isolating the motor from inner portions of the hydraulic power transmission,
   the front cover includes a radially extending outer portion, an axially extending intermediate portion and a radially extending inner portion, and
   the rotor is disposed radially outward of the axially extending intermediate portion of the front cover of the hydraulic power transmission with a predetermined clearance.

2. The hybrid-vehicle drive unit according to claim 1, wherein
   the hydraulic power transmission has a lock-up clutch radially inward of the intermadiate portion of the front cover,
   the front cover is integrated with an outer shell of a pump impeller and covers a turbine runner and the lock-up clutch, and
   a supporting member which supports the rotor is provided on the engine side of the front cover with a predetermined clearance and is rotatably supported by a bearing fitted to the motor housing.

3. The hybrid-vehicle drive unit according to claim 2, wherein
   the motor housing has a lateral wall which defines the engine side of the motor and which extends radially inward to a distal end;
   the bearing is fitted to a said distal end of the lateral wall, and
   the supporting member which supports the rotor is coupled with the front cover.

4. The hybrid-vehicle drive unit according to claim 2 wherein said rotor is disposed radially outward of the lock-up clutch and at least a portion of the rotor axially overlaps the lock-up clutch.

5. The hybrid-vehicle drive unit according to claim 2 wherein said front cover and pump impeller are rotatably supported by said motor housing through said bearing.

6. The hybrid-vehicle drive unit according to claim 1, wherein
   the hydraulic power transmission is interposed between a crank shaft of the engine and an input shaft of the automatic speed-change mechanism and includes a turbine runner, a pump impeller and a lock-up clutch that connects the turbine runner to the a pump impeller,
   the lock-up clutch is located closer to the engine than a torus of the hydraulic power transmission, is radially inward of the intermediate portion of the front cover and has a smaller diameter than an outside diameter of the torus, and
   the motor is disposed radially outward of the lock-up clutch and at least part of the motor axially overlaps the lock-up clutch.

7. The hybrid-vehicle drive unit according to claim 6, wherein
   the lock-up clutch is a multiple-plate clutch.

8. The Hybrid-vehicle drive unit according claim 7, wherein the lock-up clutch has a spring damper composed of circumferentially arranged coil springs, and the spring damper is disposed radially inside of a frictional plate portion of the lock-up clutch at a position where at least part of the spring damper axially overlaps the lock-up clutch.

9. The hybrid-vehicle drive unit according to claim 8, wherein the front cover covers the turbine runner and the lock-up clutch and couples the pump impeller with the crank shaft and the rotor.

10. The hybrid-vehicle drive unit according to claim 9, further comprising:

a sensor for detecting a rotational position of the rotor; and wherein the sensor is disposed radially inward of the stator at a position that is substantially axially aligned with the lock-up clutch.

11. The hybrid-vehicle drive unit according to claim 1, wherein the hydraulic power transmission is a torque converter including a turbine runner, a pump impeller and a stator.

12. The hybrid-vehicle drive unit according to claim 1, wherein the motor is a motor-generator that also functions as a generator.

13. The hybrid-vehicle drive unit according to claim 1, wherein the predetermined clearance between the rotor and the hydraulic power transmission is 0.8 to 3.5 mm.

14. The hybrid-vehicle drive unit according to claim 1 wherein said rotor is independently supported by a radially extending wall of said motor housing.

15. A hybrid-vehicle drive unit, comprising:

an engine;

an automatic transmission including a hydraulic power transmission and an automatic speed-change mechanism; and a motor having a stator and a rotor that is coupled with an input portion of the hydraulic power transmission, wherein a motor housing for the motor is disposed between a housing of the hydraulic power transmission and the engine, the stator is fixed to the motor housing, the rotor is rotatably supported by the motor housing, the rotor is disposed radially outward of a portion of the hydraulic power transmission with a predetermined clearance, the hydraulic power transmission has a front cover that is integrated with an outer shell of a pump impeller and that covers a turbine runner, an axially-extending center piece is integrated with the front cover and axially aligned with a crank shaft of the engine;

a distal end of the center piece is opposed to a distal end of the crank shaft of the engine with a clearance therebetween, and the center piece and the crank shaft are coupled to each other by an impact absorbing member.

16. The hybrid-vehicle drive unit according to claim 15, wherein the center piece is spline-fitted with a plate hub that is connected to the crank shaft by the impact absorbing member, and the spline-fit is a press-fit wherein a lead spline is engaged with a straight-tooth spline.

17. The hybrid-vehicle drive unit according to claim 16, wherein the supporting member which supports the rotor includes a rotor hub fitted around the center piece, and the rotor hub is held in place on the center piece by a nut screwed onto a threaded end of the center piece, and is pressed against the front cover for rotation therewith.

18. A hybrid-vehicle drive unit comprising:

an engine;

an automatic transmission including a hydraulic power transmission and an automatic speed-change mechanism; and a first housing surrounding a central opening housing said hydraulic power transmission therein a motor having a stator and a rotor that is coupled with an input portion of the hydraulic power transmission, a second housing surrounding a central opening containing said motor disposed therein, said second housing being axially aligned with said first housing and said engine and being located between said first housing and said engine;

wherein:

said stator is fixed to said second housing, said rotor is rotatably supported by said second housing, the hydraulic power transmission includes a front cover isolating the motor from inner portions of the hydraulic power transmission, the front cover includes a radially extending outer portion, an axially extending intermediate portion and a radially extending inner portion, and said rotor is disposed radially outward of the axially extending intermediate portion of the front cover of said hydraulic power transmission with a predetermined clearance.

19. The hybrid-vehicle drive unit according to claim 18, wherein the hydraulic power transmission has a lock-up clutch, the front cover is integrated with an outer shell of a pump impeller and covers a turbine runner and the lock-up clutch, and a supporting member which supports the rotor is provided on the engine side of the front cover with a predetermined clearance and is rotatably supported by a bearing fitted to the second housing.

* * * * *